Sept. 22, 1942.  M. M. DICKASON  2,296,812
LIQUID LEVEL GAUGE
Filed Aug. 26, 1940  2 Sheets-Sheet 1
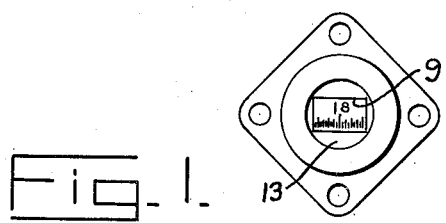
Fig. 1.
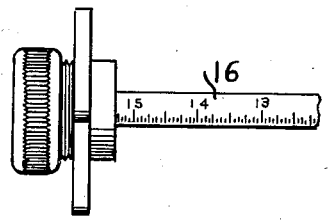
Fig. 2.
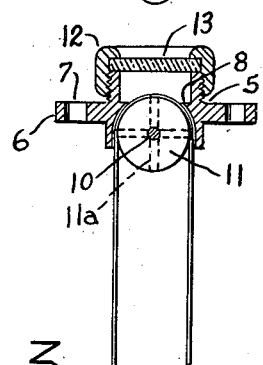
Fig. 3.
Fig. 4.
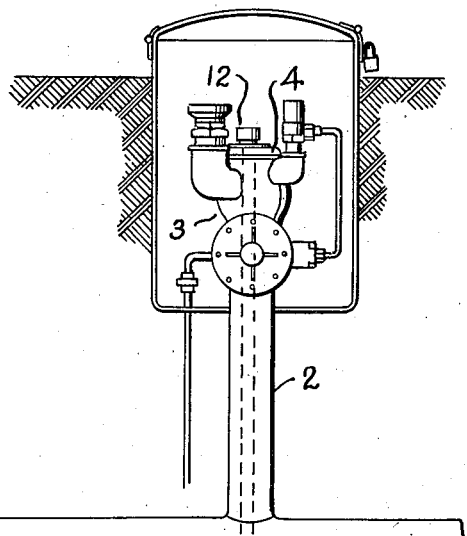
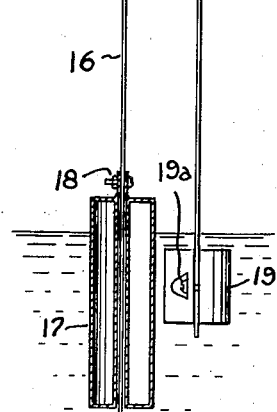
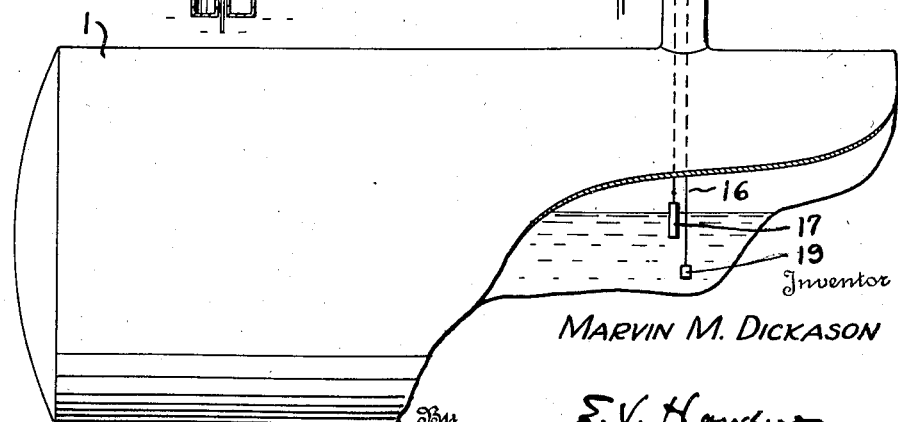
Inventor
MARVIN M. DICKASON
By E. V. Hardway
Attorney Sept. 22, 1942.  M. M. DICKASON  2,296,812
LIQUID LEVEL GAUGE
Filed Aug. 26, 1940  2 Sheets-Sheet 2
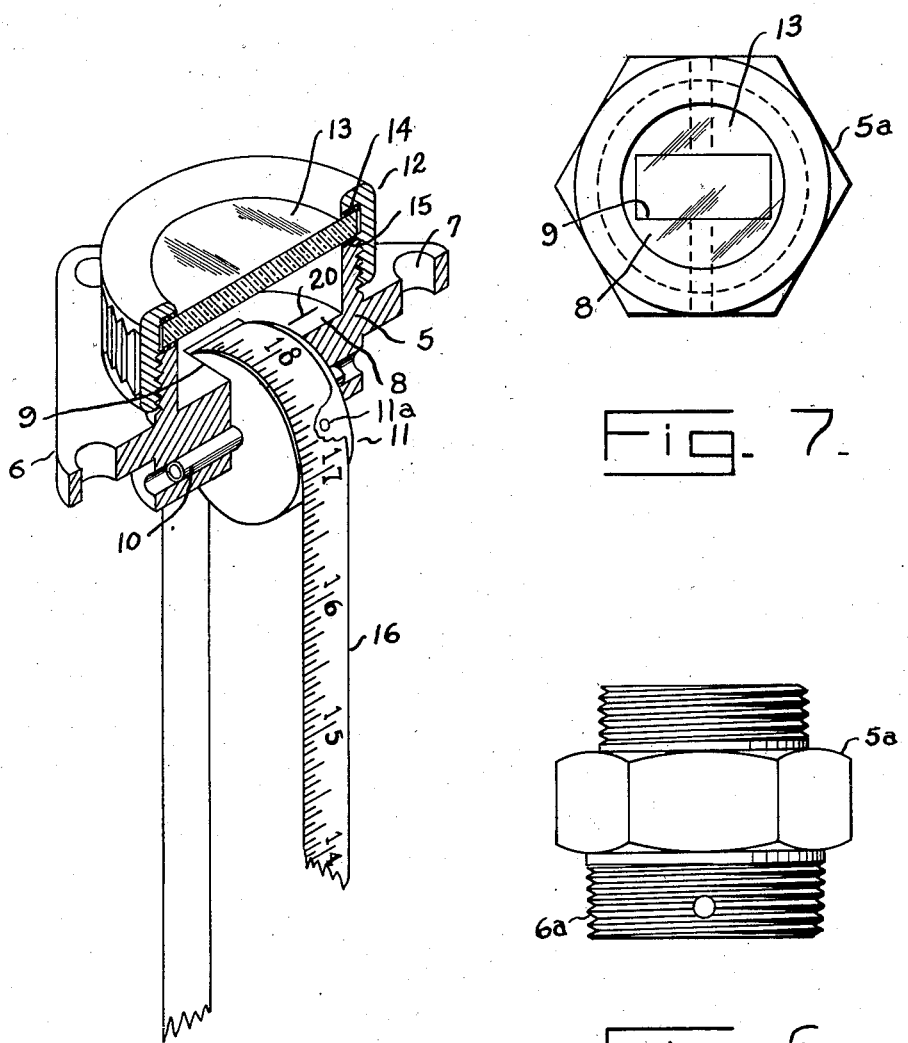
Inventor
MARVIN M. DICKASON
By E. V. Hardeway
Attorney Patented Sept. 22, 1942

2,296,812

UNITED STATES PATENT OFFICE 2,296,812

LIQUID LEVEL GAUGE

Marvin M. Dickason, Houston, Tex., assignor to J. A. Parker, Harris County, Tex.

Application August 26, 1940, Serial No. 354,207

1 Claim. (Cl. 73—321)

This invention relates to a liquid level gauge.

An object of the invention is to provide a gauge of the character described specially designed for the purpose of measuring the depth or quantity of liquid in a tank or other vessel.

The gauge has been more particularly designed with gas dispensing apparatus connected with a storage tank wherein the accumulated gas is under pressure in the tank.

It is another object of the invention to provide a gauge of the character described which, when assembled with the dispensing apparatus will readily reveal the quantity of liquid in the tank either as to depth, volume or quantity.

With the above and other objects in view the invention has particular relation to certain novel features of construction, operation and arrangement of parts, an example of which is given in this specification and illustrated in the accompanying drawings, wherein:

Figure 1 shows a plan view.

Figure 2 shows an elevational view.

Figure 3 shows a vertical sectional view.

Figure 4 shows a side elevation of the gauge as installed.

Figure 5 shows an enlarged, fragmentary, sectional view in perspective.

Figure 6 shows a side view of another embodiment of the gauge body, and

Figure 7 shows a plan view thereof.

Referring now more particularly to the drawings wherein like numerals of reference designate the same parts in each of the figures, the numeral 1 designates a storage tank preferably cylindrical in form and horizontally arranged and adapted to be buried beneath the ground surface. Welded to the top of the tank and upstanding therefrom there is a delivery tube 2. This tube is relatively small, in practice having a 2½ inch outside diameter. Its upper end is enlarged forming a bell shaped head 3 whose upper end is closed by a top plate, or cap, 4 which is preferably welded thereto. The head 3, as shown, is equipped with dispensing apparatus forming no part of the present invention. It is to be understood that the liquid level gauge herein described may be attached to the top plate 4 of the dispensing apparatus shown or may be used with other types of dispensing apparatus or may be secured directly, in certain cases, to the tank.

The liquid level gauge forming the subject matter of the present invention will now be more specifically described. It includes a forged, or die cast, body 5 preferably formed of brass. The body is tubular and may have an external, annular flange 6 formed with bolt holes 7 whereby the body may be bolted to the top plate 4 or elsewhere to the tank.

In the embodiment shown in Figures 6 and 7 this body is designated by the numeral 5a and is polygonal in form to receive a wrench and is formed with the depending externally threaded nipple 6a whereby it may be threaded into a tapped hole in said top plate or tank. In other respects the form of body shown in Figure 6 is the same as that shown in Figures 3 and 5. The body in each form, has a transverse web 8 intermediate its ends formed with a rectangular opening 9 therethrough. An axle 10 extends transversely of the opening 9 and has its ends journalled in the body. A windlass 11 is mounted for rotation on the axle and extends upwardly through the slot 9. Clamped on the upper end of the body, by means of the flange nut 12, there is a transparent lens 13. The flange nut 12 is internally threaded to be screwed onto the externally threaded upper end of the body and has an inwardly projecting flange at its upper end. The lens 13 is sealed, to prevent the escape of gas, under pressure, by means of suitable gaskets 14, 15 as shown in Figure 5. The lens should be heavy, heat treated, polar scopic tested glass adequate for withstanding any pressure that may be normally exerted against it with a necessary safety factor. It should be sweat proof so as to be at all times transparent.

A flexible tape 16 operates over the windlass and, as is obvious, moves underneath the lens so that it may be at any time easily inspected with its two ends depending downwardly into the tank. This tape is preferably of steel or alloy. The windlass 11 has the radial ducts 11a leading to its bearing through which liquid adhering to the tape may drain to lubricate said bearing.

Fastened to one end of the tape there is a float 17 which may be secured to the tape by means of a clamp 18. Adjustably attached to the other end of the tape, by the clamp screw 19a there is a counterbalance 19. The exposed side of the tape is calibrated and the gauge is read with reference to a line as 20 on the upper face of the web 8. The position of the float relative to the counterbalance may be adjusted so as to allow the setting to be made for the position of the tape with respect to the indicating line 20 and for a given tank.

The weight of the float is slightly greater than the counterbalance 19 when both are suspended in free air but in use the float rises partly out of the liquid, while the counterbalance is submerged so that there is no difference in weight between the partly submerged float and the counterbalance and hence there is no component of weight that would tend to produce slippage of the tape with reference to the windlass 11 which supports the tape. The tape may be calibrated so as to indicate the depth of the liquid, as for example, in inches, the percentage of liquid with respect to the volume of the tank or so as to show the quantity of liquid in the tank, as for example, in gallons, as may be desired.

It is obvious that as the level of the liquid varies the tape 16 will move correspondingly and the quantity of liquid in the tank may be at any time ascertained by a reading of the tape through the lens 13.

The drawings and description are illustrative merely, the invention being limited only by the scope of the appended claim.

What I claim is:

A liquid level gauge comprising a tubular body having means thereon for the attachment thereof to a liquid-containing vessel, and having a transverse web provided with an approximately rectangular slot therethrough, bearings on the underside of the web on opposite sides of the slot, an axle whose ends are extended into the bearings, said axle extending across the slot, a rotatable windless on the axle working snugly through the slot for the reception of a measuring tape thereover, a flexible measuring tape having data thereon working over the windlass and whose ends depend therefrom, a float on one end of the tape, a weight on the other end of the tape, a transparent lens closing the upper end of the body and through which the tape on the windlass is visible and a flanged nut screwed onto the upper end of the body and clamping the lens in place.

MARVIN M. DICKASON.